United States Patent
Fujitake (10) Patent No.: US 8,244,422 B2
(45) Date of Patent: Aug. 14, 2012

(54) CONTROL APPARATUS FOR VEHICLE (75) Inventor: Yoshinori Fujitake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 372 days.

(21) Appl. No.: 12/673,344

(22) PCT Filed: Sep. 2, 2008

(86) PCT No.: PCT/JP2008/065732
§ 371 (c)(1),
(2), (4) Date: Feb. 12, 2010

(87) PCT Pub. No.: WO2009/037966
PCT Pub. Date: Mar. 26, 2009

(65) Prior Publication Data
US 2010/0228413 A1 Sep. 9, 2010

(30) Foreign Application Priority Data
Sep. 20, 2007 (JP) ................................. 2007-244039

(51) Int. Cl.
*H02J 7/02* (2006.01)
*B60W 10/26* (2006.01)
*B60W 20/00* (2006.01)

(52) U.S. Cl. ....... 701/22; 180/65.29; 903/907; 320/109; 318/139

(58) Field of Classification Search ................. 701/22; 180/65.265, 65.29, 65.275, 65.27; 903/907, 903/904, 903, 902; 320/109, 107; 307/10.1; 318/139

See application file for complete search history.

(56) References Cited

U.S. PATENT DOCUMENTS

| | | | |
|---|---|---|---|
| 5,202,617 A * | 4/1993 | Nor | 320/130 |
| 5,717,310 A | 2/1998 | Sakai et al. | |
| 5,793,189 A * | 8/1998 | Kawaguchi et al. | 322/28 |
| 7,693,609 B2 * | 4/2010 | Kressner et al. | 700/291 |
| 8,063,605 B2 * | 11/2011 | Tonegawa et al. | 320/107 |
| 2005/0077874 A1 | 4/2005 | Nakao | |

(Continued)

FOREIGN PATENT DOCUMENTS
JP    A-7-123519    5/1995
(Continued)

OTHER PUBLICATIONS

Aug. 12, 2011 Office Action issued in Russian Application No. 2010115491/11(021981) (with translation). Jan. 6, 2009 Office Action issued in Japanese Patent Application No. 2007-244039 (with translation).

(Continued)

*Primary Examiner* — Paul N Dickson
*Assistant Examiner* — Keith Frisby
(74) *Attorney, Agent, or Firm* — Oliff & Berridge, PLC (57) ABSTRACT

In the case where a connector of a charging cable is connected to a charging connector provided on a hybrid vehicle, a connector signal CNCT indicating that the connector of the charging cable is connected to the charging connector provided on the hybrid vehicle is input to a power supply ECU and an HV_ECU having an operating frequency higher than that of the power supply ECU. When the connector signal CNCT is input, the power supply ECU activates the HV_ECU. The HV_ECU controls the electrical system of the hybrid vehicle so as to charge a battery pack. The HV_ECU stops the charging when the input of the connector signal CNCT is stopped during charging of the battery pack.

6 Claims, 7 Drawing Sheets

U.S. PATENT DOCUMENTS

| | | | |
|---|---|---|---|
| 2008/0180058 A1* | 7/2008 | Patel et al. ............... | 320/109 |
| 2009/0021213 A1* | 1/2009 | Johnson ................. | 320/109 |

FOREIGN PATENT DOCUMENTS

| | | |
|---|---|---|
| JP | A 7-231513 | 8/1995 |
| JP | A 9-161882 | 6/1997 |
| JP | A 9-163616 | 6/1997 |
| JP | A 10-304582 | 11/1998 |
| JP | A-2002-213272 | 7/2002 |
| JP | A 2002-262403 | 9/2002 |
| JP | A 2003-174738 | 6/2003 |
| JP | A 2007-209168 | 8/2007 |
| RU | 2 053 897 C1 | 2/1996 |

OTHER PUBLICATIONS

Oct. 21, 2008 Written Opinion issued in International Patent Application No. PCT/JP2008/065732 (with translation).

Oct. 21, 2008 Office Action issued in Japanese Patent Application No. 2007-244039 (with translation).

"SAE Electric Vehicle Conductive Charge Coupler," SAE Standards J1772, SAE International, Nov. 2001 (with translation).

International Search Report issued for International Application No. PCT/JP2008/065732 on Oct. 21, 2008 (with translation).

Japanese Office Action issued for Japanese Application No, 2007-244039 on Jan. 6, 2009.

* cited by examiner

CONTROL APPARATUS FOR VEHICLE

TECHNICAL FIELD

The present invention relates to a control apparatus for a vehicle, and particularly to a technique for controlling an electrical system having a battery storing electric power supplied from a power supply external to the vehicle through an EVSE (Electric Vehicle Supply Equipment).

BACKGROUND ART

Conventionally, a vehicle such as a hybrid vehicle, an electric vehicle and a fuel-cell vehicle using an electric motor as a driving source has been known. Such a vehicle is provided with a power storage mechanism such as a battery for storing electric power supplied to the electric motor. The electric power generated during regenerative braking or generated by a power generator mounted in the vehicle is stored in the battery.

There are also some vehicles in which electric power is supplied from a power supply external to the vehicle such as a household power supply to the battery mounted in the vehicle for charging the battery. The outlet disposed on the house is coupled to the connector (inlet) provided on the vehicle via a cable to supply electric power from the household power supply to the battery of the vehicle. The vehicle having a battery mounted therein and charged by the power supply provided external to the vehicle is hereinafter also referred to as a plug-in vehicle.

Usually, a plug-in vehicle is charged in the state where the plug-in vehicle is parked in the parking area and the like. In other words, since the ignition switch is turned off, in the state where the ECU (Electronic Control Unit) for controlling the electrical system mounted in the plug-in vehicle is deactivated (the state where the electric power is not supplied to the ECU), the cable is connected to the plug-in vehicle for charging the battery. Accordingly, in order to charge the battery, the ECU should be activated when the cable is connected to the plug-in vehicle. The technique addressing the above-described problems is disclosed in Japanese Patent Laying-Open No. 10-304582 (Patent Document 1).

Japanese Patent Laying-Open No. 10-304582 discloses an inductive charging device for charging the battery by an inductive current generated in the charging coil which is electromagnetically coupled to a power supply coil, in which the power supply coil is located in the charging position that allows an electromagnetic coupling to the charging coil, which brings about the state where the communication can be carried out. The inductive charging device includes a communication device which outputs an activation signal in response to the communication with the power supply device in the above-described state; and a charging controller activated by the activation signal from the communication device for controlling the charging of the battery by the current of the charging coil. When the power supply coil is located in the charging position, the charging controller is activated based on the communication by the communication device to start the charging.

According to the inductive charging device disclosed in this document, when the power supply coil is located in the charging position at the start of charging, the communication device is brought into the state where the communication can be carried out. For example, a limit switch that is closed when the power supply coil is located in the charging position is provided such that current is supplied to the communication device while the limit switch is closed. In this state, the communication device communicates with the power supply device and outputs an activation signal in response to the communication. Consequently, the charging controller is activated and the battery is charged under the control of the charging controller.

Patent Document 1: Japanese Patent Laying-Open No. 10-304582

DISCLOSURE OF THE INVENTION

Problems to be Solved by the Invention

In the plug-in vehicle, the cable may be disconnected from the plug-in vehicle during battery charging. If the cable is disconnected from the plug-in vehicle while the battery is charged, that is, while electric power flows through the cable, an arc may occur at the terminal of the cable, which may deteriorate the terminal. However, Japanese Patent Laying-Open No. 10-304582 fails to disclose any suitable technique for stopping the charging when the cable is disconnected from the plug-in vehicle.

An object of the present invention is to provide a control apparatus for a vehicle which allows the charging to be immediately stopped.

Means for Solving the Problems

A control apparatus for a vehicle according to an aspect is provided with an electrical system having a battery storing electric power supplied from an external power supply through an EVSE. The control apparatus includes a first control unit that receives an input of a connector signal indicating that the EVSE is connected to the vehicle when the EVSE is connected to the vehicle, and a second control unit that has an operating frequency higher than an operating frequency of the first control unit and receives an input of the connector signal when the EVSE is connected to the vehicle. The first control unit activates the second control unit when the connector signal is input. The second control unit controls, in an activated state, the electrical system to charge the battery, and controls the electrical system to stop charging the battery when the input of the connector signal is stopped.

According to this configuration, the electrical system mounted in the vehicle has the battery storing electric power supplied from the power supply external to the vehicle through the EVSE. When the EVSE is connected to the vehicle, the first control unit and the second control unit each receive an input of the connector signal indicating that the EVSE is connected to the vehicle. When receiving the input of the connector signal, the first control unit activates the second control unit. In the activated state, the second control unit having an operating frequency higher than that of the first control unit controls the electrical system to charge the battery. When the input of the connector signal is stopped, this second control unit controls the electrical system to stop the charging of the battery. Accordingly, in the case where the input of the connector signal is stopped, that is, where the EVSE is removed from the vehicle, the charging can be stopped by the second control unit which is higher in operating frequency than the first control unit and therefore can detect that the input of the connector signal is stopped before the first control unit does. Therefore, the charging can be stopped relatively immediately, for example, as compared to the case where the charging is stopped by the first control unit deactivating the second control unit when the input of the connector signal is stopped. Consequently, the charging can be stopped immediately.

Preferably, the second control unit transmits, during charging of the battery, a charging signal to the first control unit indicating that the battery is being charged; and stops transmitting the charging signal when charging of the battery is stopped. The first control unit deactivates the second control unit when the charging signal is stopped.

According to this configuration, during charging of the battery, the charging signal indicating that the battery is being charged is transmitted from the second control unit to the first control unit. Furthermore, when the charging of the battery is stopped, the transmission of the charging signal is stopped. When the charging signal is stopped, the first control unit deactivates the second control unit. This allows reduction in electric power consumed by the second control unit in the state where the charging is stopped.

Further preferably, the first control unit activates the second control unit by using an IG signal to output an IG_ON command and deactivates the second control unit by using the IG signal to output an IG_OFF command.

According to this configuration, the IG signal transmitted from the first control unit to the second control unit is used to allow control of activation and deactivation of the second control unit.

Further preferably, the second control unit is an HV_ECU controlling charging of the battery. The first control unit is a power supply ECU controlling activation and deactivation of the HV_ECU.

According to this configuration, in the system in which the power supply ECU controls the activation and deactivation of the HV_ECU controlling the charging of the battery, the charging can be stopped immediately when the EVSE is removed from the vehicle.

Further preferably, the first control unit and the second control unit are mounted in the vehicle.

According to this configuration, in the vehicle provided with the first control unit for controlling the activation of the second control unit along with the second control unit for controlling the charging of the battery, the charging can be stopped immediately when the EVSE is removed from the vehicle.

Further preferably, the vehicle is a plug-in hybrid vehicle.

According to this configuration, in the plug-in hybrid vehicle, the charging can be stopped immediately when the EVSE is removed from the vehicle.

BEST MODES FOR CARRYING OUT THE INVENTION

The embodiments of the present invention will be hereinafter described with reference to the accompanying drawings, in which the same or corresponding components are designated by the same reference characters. Names and functions thereof are the same, and therefore, description thereof will not be repeated.

Figure 1:
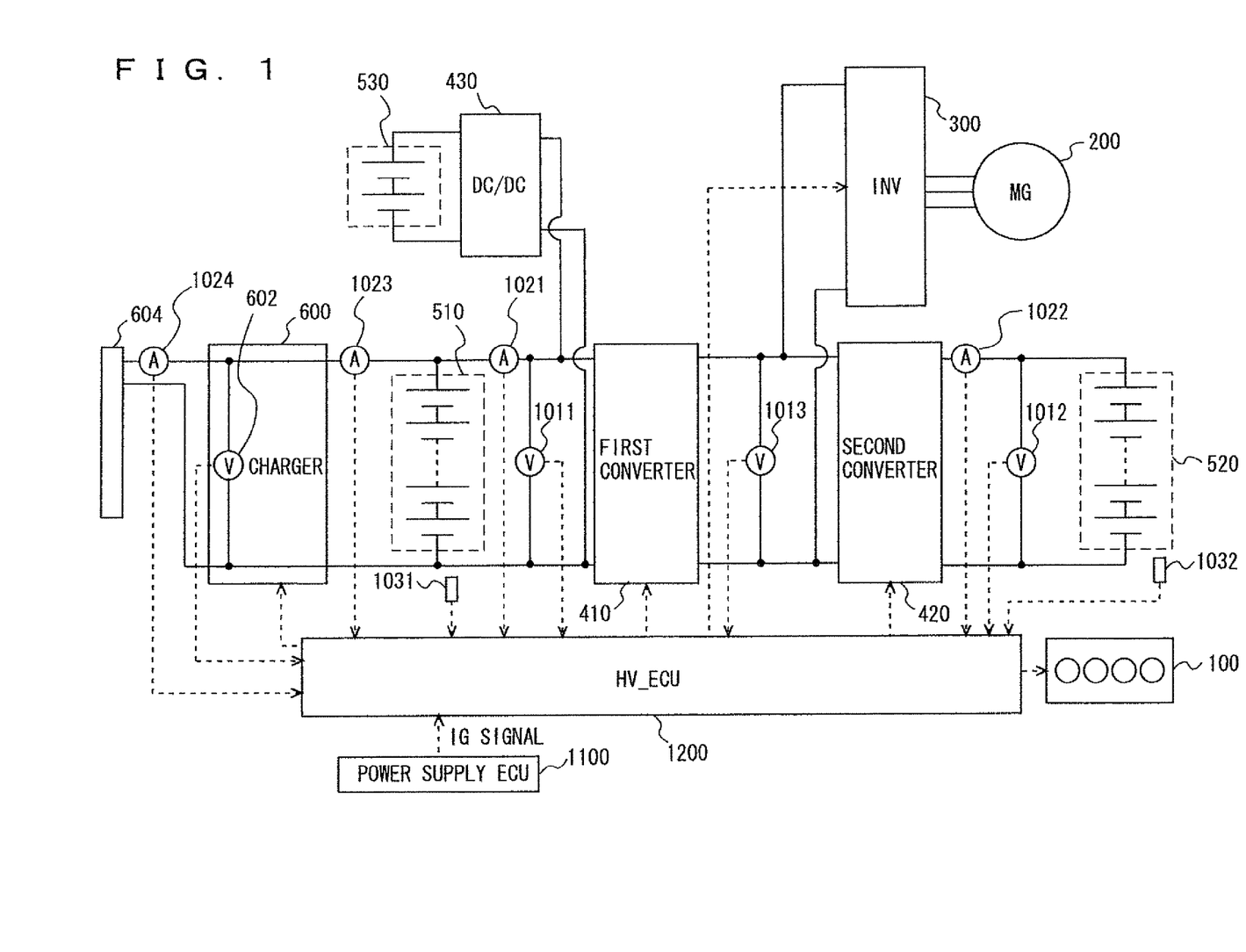
FIG. 1 is a diagram of an electrical system of a hybrid vehicle.

Referring to FIG. 1, a hybrid vehicle provided with a control apparatus according to the embodiment of the present invention will be hereinafter described. This hybrid vehicle has an engine 100, an MG (Motor Generator) 200, an inverter 300, a first converter 410, a second converter 420, a DC/DC converter 430, a first battery pack 510, a second battery pack 520, an auxiliary battery 530, a charger 600, a power supply ECU 1100, and an HV_ECU 1200. It is to be noted that each of power supply ECU 1100 and HV_ECU 1200 may be divided into a plurality of ECUs.

The electrical system of this hybrid vehicle includes MG (Motor Generator) 200, inverter 300, first converter 410, second converter 420, DC/DC converter 430, first battery pack 510, second battery pack 520, auxiliary battery 530, and charger 600.

The hybrid vehicle runs by driving force from at least one of engine 100 and MG 200. In place of the hybrid vehicle, an electric vehicle, a fuel-cell vehicle and the like which run only by the driving force of MG 200 may be applied.

MG 200 serves as a three-phase alternating-current (AC) motor. MG 200 carries out a drive operation by the electric power stored in first battery pack 510 and second battery pack 520. The electric power converted from a direct current into an alternating current by inverter 300 is supplied to MG 200.

The driving force of MG 200 is transmitted to wheels. This causes MG 200 to assist engine 100 and the vehicle to run by the driving force from MG 200. On the other hand, during regenerative braking of the hybrid vehicle, MG 200 is driven by the wheels to thereby operate MG 200 as a power generator. Accordingly, MG 200 operates as a regenerative brake for converting braking energy into electric power. The electric power generated by MG 200 is converted by inverter 300 from an alternating current into a direct current, and then stored in first battery pack 510 and second battery pack 520.

Each of first battery pack 510 and second battery pack 520 serves as a battery set having a configuration in which a plurality of battery modules each having a plurality of battery cells integrated with each other are connected in series. The discharging voltage from first battery pack 510 and the charging voltage to first battery pack 510 are adjusted by first converter 410. The discharging voltage from second battery pack 520 and the charging voltage to second battery pack 520 are adjusted by second converter 420. First battery pack 510 and second battery pack 520 may have the same or different specifications such as maximum storage amount.

Auxiliary battery 530 has a capacity and a voltage less than those of each of first battery pack 510 and second battery pack 520.

First converter 410 and second converter 420 are connected in parallel. First battery pack 510 is connected to first converter 410. Second battery pack 520 is connected to second converter 420. Accordingly, first battery pack 510 and second battery pack 520 are connected in parallel via first converter 410 and second converter 420. Inverter 300 is connected between first converter 410 and second converter 420.

DC/DC converter 430 is connected in parallel to first converter 410 between first converter 410 and first battery pack 510. DC/DC converter 430 adjusts the voltage. The electric power output from DC/DC converter 430 is stored in auxiliary battery 530.

Charger 600 is connected to the positive terminal and the negative terminal of first battery pack 510. Accordingly, first battery pack 510 and second battery pack 520 are connected in parallel to charger 600. It is to be noted that a capacitor (condenser) may be used in place of a battery. Charger 600 supplies a direct current to the battery pack. In other words, charger 600 converts an alternating current into a direct current. Furthermore, charger 600 boosts the voltage.

When first battery pack 510 and second battery pack 520 are charged, charger 600 supplies electric power to first battery pack 510 and second battery pack 520 from outside the hybrid vehicle. It is to be noted that charger 600 may be located outside the hybrid vehicle.

A voltage sensor 602 is provided within charger 600. The signal indicating the voltage value detected by voltage sensor 602 is transmitted to HV_ECU 1200. The voltage of the external power supply is detected within the hybrid vehicle by voltage sensor 602. Charger 600 is connected to the external power supply through the charging cable connected to a charging connector (inlet) 604. First battery pack 510 and second battery pack 520 are connected to the external power supply via charger 600.

Power supply ECU 1100 and HV_ECU 1200 will be hereinafter described, Power supply ECU 1100 and HV_ECU 1200 each correspond to a computer configured from a CPU (Central Processing Unit), a ROM (Read Only Memory), a RAM (Random Access Memory), and the like.

Power supply ECU 1100 and HV_ECU 1200 operate with the electric power supplied from auxiliary battery 530. Power supply ECU 1100 is always activated while the electric power is supplied from auxiliary battery 530, Power supply ECU 1100 controls HV_ECU 1200 to switch between the activated state and the deactivated state (state where supply of the electric power is interrupted).

Power supply ECU 1100 transmits an IG signal to HV_ECU 1200 to thereby switch HV_ECU 1200 between the activated state and the deactivated state. When an IG_ON command is output using the IG signal, HV_ECU 1200 is activated. When an IG_OFF command is output using the TO signal, HV_ECU 1200 is deactivated.

HV_ECU 1200 has an operating frequency higher than that of power supply ECU 1100. For example, the operating frequency of power supply ECU 1100 is 15.625 [kHz]. The operating frequency of HV_ECU 1200 is 250 [kHz]. In other words, HV_ECU 1200 operates at a sampling timing higher than that of power supply ECU 1100.

The main function of power supply ECU is to activate HV_ECU 1200, Accordingly, even if the operating frequency thereof is relatively low, no significant problem occurs. On the other hand, HV_ECU 1200 controls at least engine 100, inverter 300, first converter 410, second converter 420, and charger 600, and therefore, requires a relatively high operating frequency.

HV_ECU 1200 receives a signal from voltage sensors 1011-1013 and current sensors 1021-1024.

Voltage sensor 1011 detects a voltage value of first battery pack 510. Voltage sensor 1012 detects a voltage value of second battery pack 520. Voltage sensor 1013 detects a system voltage value (voltage value in the area between first converter 410 and second converter 420).

Current sensor 1021 detects a value of the current discharged from first battery pack 510 and a value of the current supplied to first battery pack 510. Current sensor 1022 detects a value of the current discharged from second battery pack 520 and a value of the current supplied to second battery pack 520. Current sensor 1023 detects a value of the current supplied from charger 600 to each of first battery pack 510 and second battery pack 520. Current sensor 1024 detects a value of the current (a value of the alternating current) supplied from the power supply external to the hybrid vehicle through charging cable 700.

HV_ECU 1200 receives a signal indicating the temperature of first battery pack 510 from a temperature sensor 1031 and a signal indicating the temperature of second battery pack 520 from a temperature sensor 1032.

HV_ECU 1200 calculates the state of charge (SOC) of each of first battery pack 510 and second battery pack 520 based on the values of the voltage, the current and the like input from these sensors. Since the SOC may be calculated using a well-known general technique, detailed description thereof will not be repeated.

Figure 2:
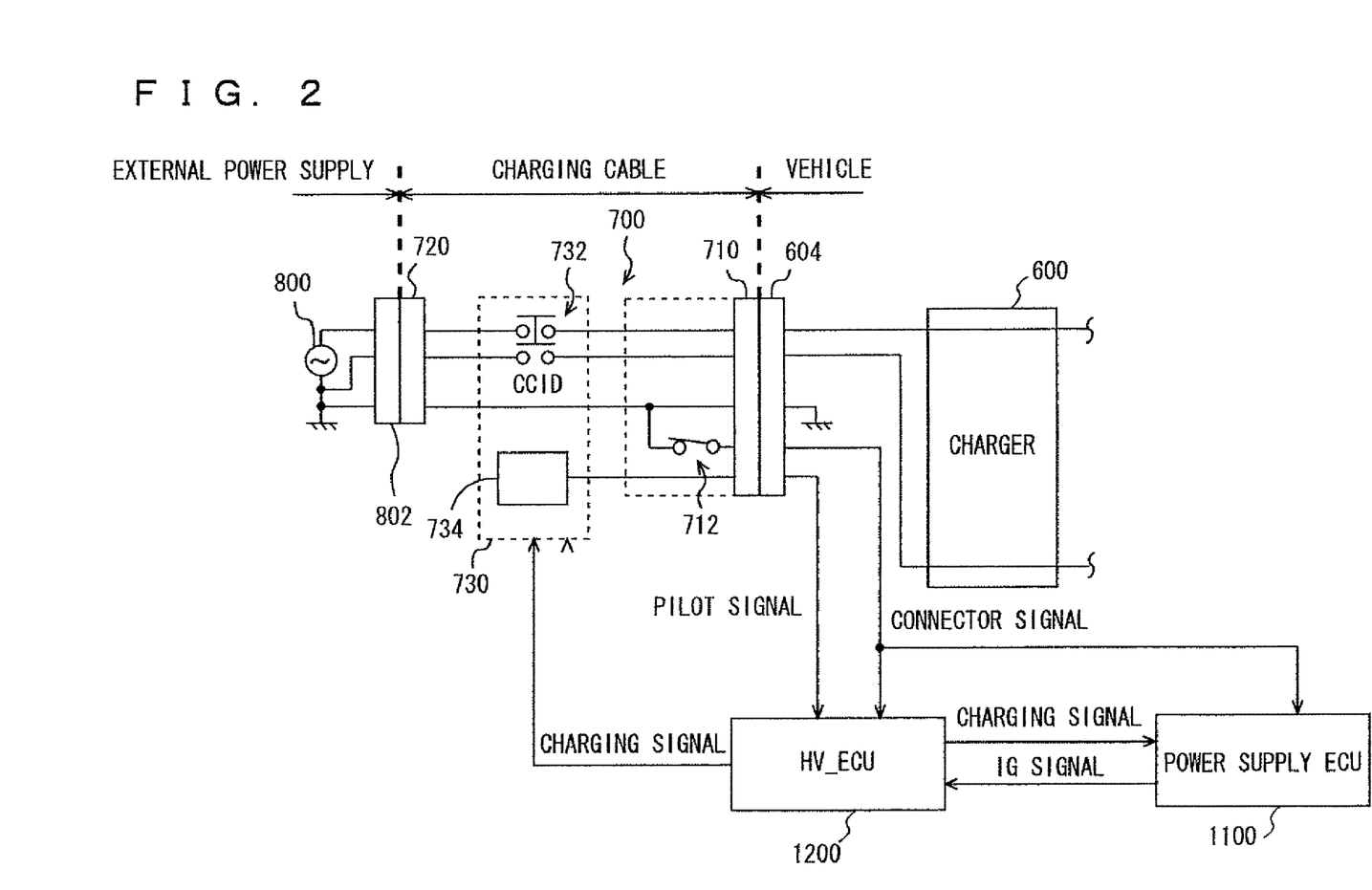
FIG. 2 is a diagram of a charging cable.

Referring to FIG. 2, charging cable 700 will then be described. Charging cable 700 includes a connector 710, a plug 720, and a CCID (Charging Circuit Interrupt Device) 730. Charging cable 700 corresponds to the EVSE.

Connector 710 of charging cable 700 is connected to charging connector 604 provided on the hybrid vehicle. Connector 710 is provided with a switch 712. When switch 712 is closed in the state where connector 710 of charging cable 700 is connected to charging connector 604 provided on the hybrid vehicle, power supply ECU 1100 and HV_ECU 1200 each receive a connector signal CNCT indicating that connector 710 of charging cable 700 is connected to charging connector 604 provided on the hybrid vehicle.

Switch 712 opens and closes in coordination with an anchor fitting anchoring connector 710 of charging cable 700 to charging connector 604 of the hybrid vehicle. The anchor fitting swings by the user pressing the button provided on connector 710.

Figure 3:
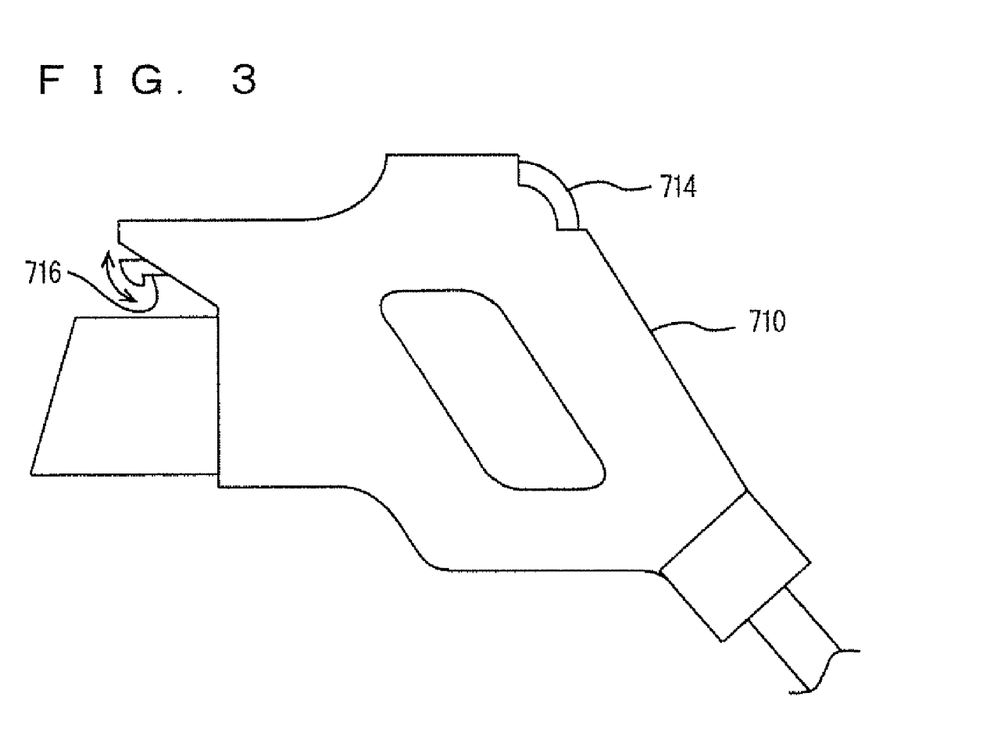
FIG. 3 is a diagram of a connector of the charging cable.

For example, when the operator moves the finger off a button 714 of connector 710 shown in FIG. 3 in the state where connector 710 of charging cable 700 is connected to charging connector 604 provided on the hybrid vehicle, an anchor fitting 716 engages with charging connector 604 provided on the hybrid vehicle and switch 712 is closed. When the operator presses button 714, anchor fitting 716 is disengaged from charging connector 604 and switch 712 is opened. It is to be noted that the method of opening and closing switch 712 is not limited thereto.

Referring back to FIG. 2, plug 720 of charging cable 700 is connected to a outlet 802 provided on the house. The AC electric power is supplied from external power supply 800 of the hybrid vehicle to outlet 802.

CCID 730 includes a relay 732 and a control pilot circuit 734. In the state where relay 732 is opened, the path is interrupted through which the electric power is supplied from external power supply 800 of the hybrid vehicle to the hybrid vehicle. In the state where relay 732 is closed, the electric power can be supplied from external power supply 800 of the hybrid vehicle to the hybrid vehicle. HV_ECU 1200 controls the state of relay 732 in the state where connector 710 of charging cable 700 is connected to charging connector 604 of the hybrid vehicle.

Control pilot circuit 734 transmits a pilot signal (square wave signal) CPLT to a control pilot line in the state where plug 720 of charging cable 700 is connected to outlet 802, that is, external power supply 800, and where connector 710 is connected to charging connector 604 provided on the hybrid vehicle.

The pilot signal is oscillated by an oscillator provided in control pilot circuit 734. The pilot signal is output or stopped with a delay by the time period for which the operation of the oscillator delays.

When plug 720 of charging cable 700 is connected to outlet 802, control pilot circuit 734 may output a constant pilot signal CPLT even if connector 710 is disconnected from charging connector 604 provided on the hybrid vehicle. However, HV_ECU 1200 cannot detect pilot signal CPLT output in the state where connector 710 is disconnected from charging connector 604 provided on the hybrid vehicle, When plug 720 of charging cable 700 is connected to outlet 802 and connector 710 is connected to charging connector 604 of the hybrid vehicle, control pilot circuit 734 oscillates pilot signal CPLT of a predetermined pulse width (duty cycle).

The hybrid vehicle is notified of the current capacity of charging cable 700 (a value of the current that can be supplied by charging cable 700) in accordance with the pulse width of pilot signal CPLT. The pulse width of pilot signal CPLT is constant independently of the voltage and the current of external power supply 800.

In the case where a different charging cable is used, the pulse width of pilot signal CPLT may vary. In other words, the pulse width of pilot signal CPLT may be set for each type of the charging cables.

In the present embodiment, the electric power supplied from external power supply 800 is supplied to the battery pack in the state where the hybrid vehicle and external power supply 800 are coupled to each other by charging cable 700.

In other words, HV_ECU 1200 controls the electrical system, particularly, first converter 410, second converter 420 and charger 600 so as to charge first battery pack 510 and second battery pack 520.

During charging of the battery pack, HV_ECU 1200 transmits the charging signal to power supply ECU 1100 and CCID 730 indicating that the battery pack is being charged. When the charging of the battery pack is stopped, the transmission of the charging signal is stopped.

In the present embodiment, when the input of connector signal CNCT is stopped during charging of the battery pack, HV_ECU 1200 stops the charging and also stops the transmission of the charging signal. When the transmission of the charging signal is stopped, power supply ECU 1100 deactivates HV_ECU 1200.

Figure 4:
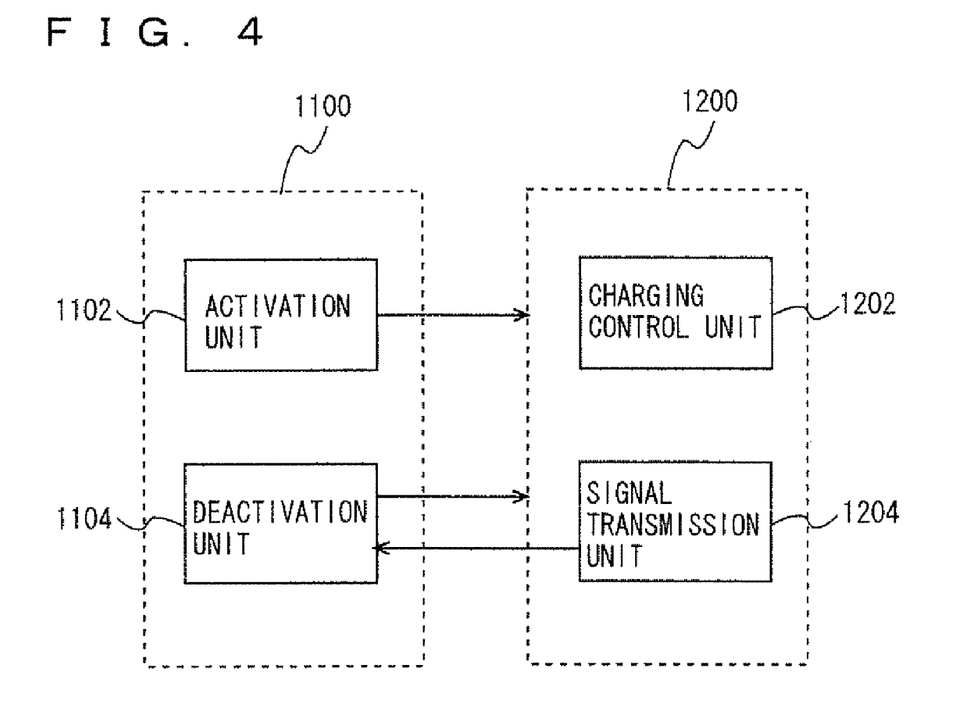
FIG. 4 is a functional block diagram of a power supply ECU and an HV_ECU.

Referring to FIG. 4, the function of each of power supply ECU 1100 and HV_ECU 1200 will be hereinafter described. It is to be noted that the functions described below may be implemented by hardware or software.

Power supply ECU 1100 includes an activation unit 1102 and a deactivation unit 1104. When connector signal CNCT is input, activation unit 1102 activates HV_ECU 1200 by using the IG signal to output an IG_ON command. When the transmission of the charging signal from HV_ECU 1200 is stopped, deactivation unit 1104 deactivates HV_ECU 1200 by using the IG signal to output an IG_OFF command.

HV_ECU 1200 includes a charging control unit 1202 and a signal transmission unit 1204. If predetermined charging conditions are satisfied in the state where HV_ECU 1200 is activated, charging control unit 1202 controls the electrical system of the hybrid vehicle to charge first battery pack 510 and second battery pack 520.

The charging conditions include, for example, those that connector signal CNCT is input, that pilot signal CPLT is input, and that the voltage of power supply 800 detected within the hybrid vehicle (voltage detected by voltage sensor 602) is greater than or equal to a threshold value. It is to be noted that the charging conditions are not limited thereto.

Furthermore, when the input of connector signal CNCT is stopped during charging of first battery pack 510 and second battery pack 520, charging control unit 1202 stops charging first battery pack 510 and second battery pack 520. In other words, the electrical system of the hybrid vehicle is controlled to stop the charging.

Signal transmission unit 1204 transmits a charging signal during charging of first battery pack 510 and second battery pack 520. Furthermore, when the charging of each of first battery pack 510 and second battery pack 520 is stopped, signal transmission unit 1204 stops the transmission of the charging signal.

Figure 5:
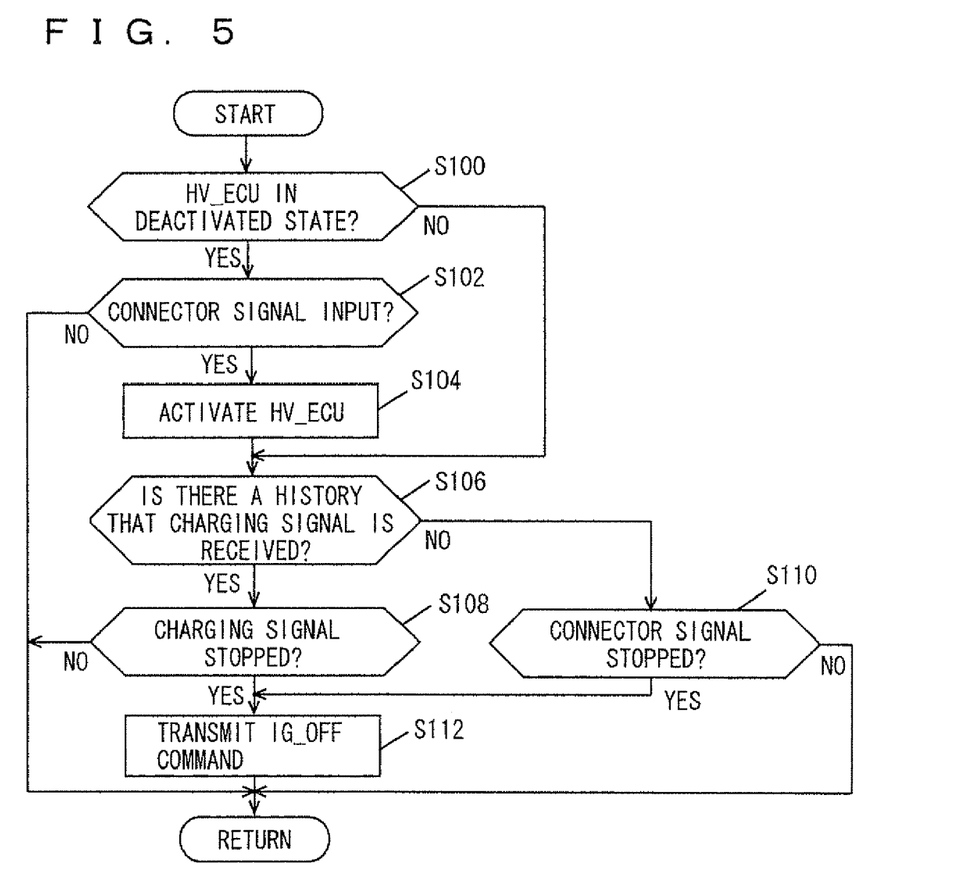
FIG. 5 is a flowchart illustrating a control structure of a program executed by the power supply ECU.

Referring to FIG. 5, the control structure of the program executed by power supply ECU 1100 will then be described. The program described below is stored, for example, in the ROM of power supply ECU 1100.

In step (hereinafter abbreviated as S) 100, power supply ECU 1100 determines whether HV_ECU 1200 is in the deactivated state (state where an ignition switch is turned OFF). Since power supply ECU 1100 controls activation and deactivation of HV_ECU 1200, it is determined within power supply ECU 1100 whether or not HV_ECU 1200 is in the deactivated state. If HV_ECU 1200 is in the deactivated state (YES in S100), the process proceeds to S102. If not (NO in S100), the process proceeds to S106.

In S102, power supply ECU 1100 determines whether connector signal CNCT is input or not. If connector signal CNCT is input (YES in S102), the process proceeds to S104. If not (NO in S102), the process returns to S100.

In S104, power supply ECU 1100 activates HV_ECU 1200. In S106, power supply ECU 1100 determines whether there is a history that the charging signal is received. If there is a history that the charging signal is received (YES in S106), the process proceeds to S108. If not (NO in S106), the process proceeds to S110.

In S108, power supply ECU 1100 determines whether the charging signal is stopped. If the charging signal is stopped (YES in S108), the process proceeds to S112. If not (NO in S108), the process returns to S100.

In S110, power supply ECU 1100 determines whether connector signal CNCT is stopped. If connector signal CNCT is stopped (YES in S110), the process proceeds to S112. If not (NO in S110), the process returns to S100. In S112, power supply ECU 1100 transmits an IG_OFF command to HV_ECU 1200. In other words, power supply ECU 1100 deactivates HV_ECU 1200.

Figure 6:
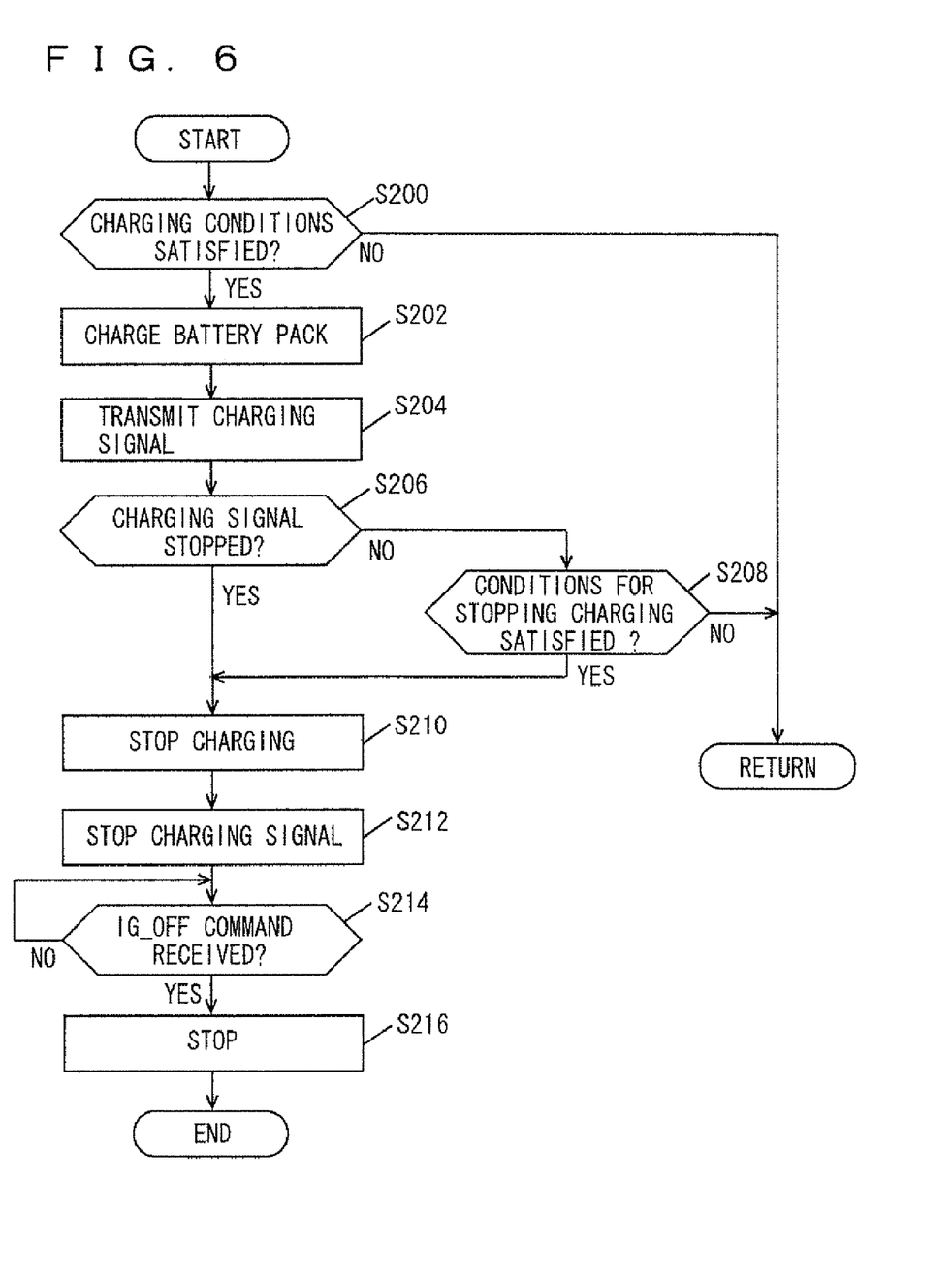
FIG. 6 is a flowchart illustrating a control structure of a program executed by the HV_ECU.

Referring to FIG. 6, the control structure of the program executed by HV_ECU 1200 will then be described. The program described below is stored, for example, in the ROM of HV_ECU 1200.

In S200, HV_ECU 1200 determines whether the charging conditions for starting to charge first battery pack 510 and second battery pack 520 are satisfied. If the charging conditions are satisfied (YES in S200), the process proceeds to S202. If not (NO in S200), the process returns to S200.

In S202, HV_ECU 1200 charges first battery pack 510 and second battery pack 520. In S204, HV_ECU 1200 transmits the charging signal.

In S206, HV_ECU 1200 determines whether connector signal CNCT is stopped. If connector signal CNCT is stopped (YES in S206), the process proceeds to S210. If not (NO in S206), the process proceeds to S208.

In S208, HV_ECU 1200 determines whether the conditions for stopping the charging are satisfied. The conditions for stopping the charging include, for example, a condition that first battery pack 510 and second battery pack 520 are fully charged, but are not limited thereto. If the conditions for stopping the charging are satisfied (YES in S208), the process proceeds to S210. If not (NO in S208), the process returns to S200.

In S210, HV_ECU 1200 stops the charging. In other words, the electrical system of the hybrid vehicle is controlled to stop the charging. In S212, HV_ECU 1200 stops the transmission of the charging signal.

In S214, HV_ECU 1200 determines whether it receives the IG_OFF command from power supply ECU 1100. If HV_ECU 1200 receives the IG_OFF command (YES in S214), the process proceeds to S216. If not (NO in S214), the process returns to S214. In S216, HV_ECU 1200 is deactivated.

The functions of power supply ECU 1100 and HV_ECU 1200 based on the above-described structures and flowcharts will then be described.

When connector signal CNCT is input to power supply ECU 1100 (S102) in the state where HV_ECU 1200 is deactivated (YES in S100), HV_ECU 1200 is activated (S104).

When HV_ECU 1200 is activated, it is determined whether the charging conditions are satisfied (S200). When the charging conditions are satisfied (YES in S200), first battery pack 510 and second battery pack 520 are charged (S202). Then, a charging signal is transmitted from HV_ECU 1200 to power supply ECU 1100 (S204).

Even before the charging of first battery pack 510 and second battery pack 520 is completed, there may be a need, for example, to run the hybrid vehicle. In this case, the user may disconnect connector 710 of charging cable 700 from charging connector 604 of the hybrid vehicle. In such a case, the process for stopping the charging of first battery pack 510 and second battery pack 520 should be carried out within the hybrid vehicle.

Figure 7:
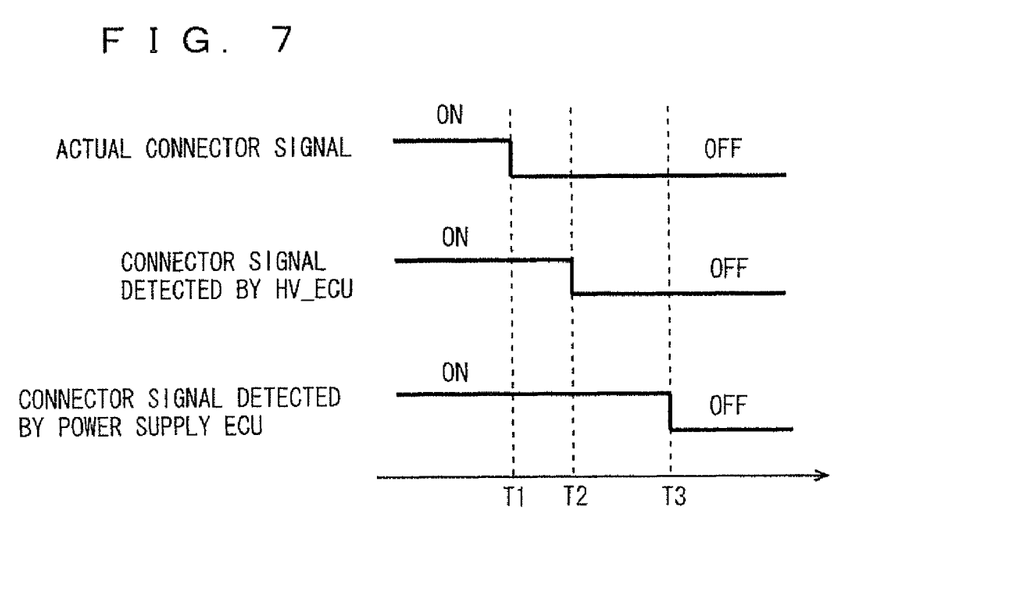
FIG. 7 is a timing chart illustrating the timing at which a connector signal CNCT is stopped.

However, the operating frequency of power supply ECU 1100 is lower than that of HV_ECU 1200. Accordingly, as shown in FIG. 7, power supply ECU 1100 lags behind HV_ECU 1200 in detecting that connector 710 of charging cable 700 is disconnected from charging connector 604 of the hybrid vehicle, that is, connector signal CNCT is stopped. Therefore, the configuration in which the charging is stopped in response to the command from power supply ECU 1100 may cause an increase in the time period from the time when connector signal CNCT is stopped to the time when the charging is stopped.

Figure 8:
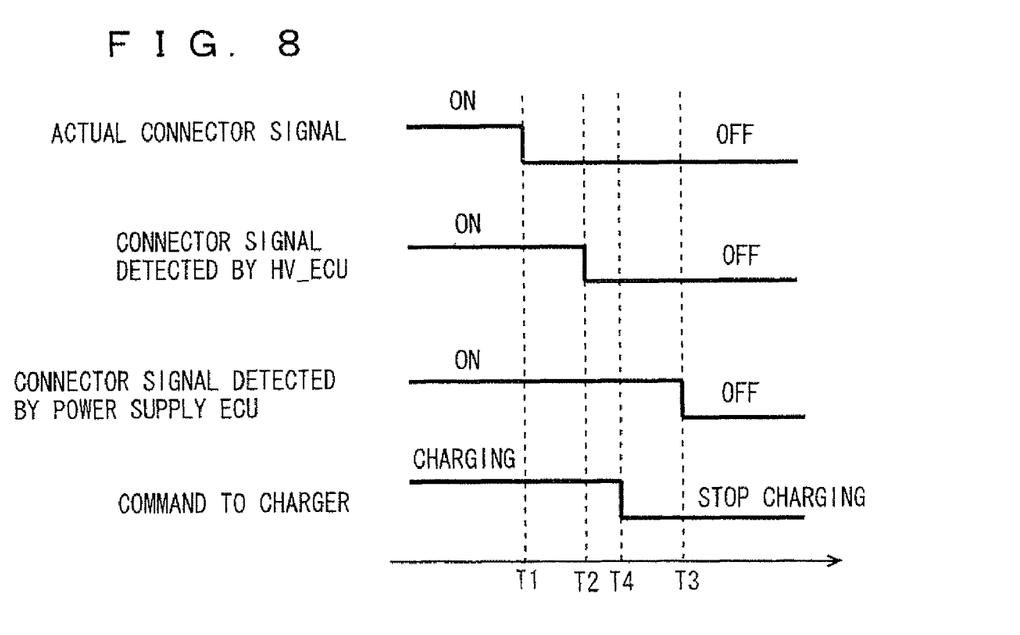
FIG. 8 is a timing chart illustrating the timing at which charging is stopped.

Then, if HV_ECU 1200 determines that connector signal CNCT is stopped (YES in S206), the charging is stopped (S210). Consequently, as shown in FIG. 8, the charging can be stopped before power supply ECU 1100 detects that connector signal CNCT is stopped.

On the other hand, in the case where connector signal CNCT is input (S204), the charging is stopped (S210) when the conditions for stopping the charging are satisfied (YES in S208). After the charging is stopped, the charging signal is stopped (S212).

In the case where power supply ECU 1100 includes a history that the charging signal is received (YES in S106), when the charging signal is stopped (YES in S108), power supply ECU 1100 transmits an IG_OFF command to HV_ECU 1200.

In the case where power supply ECU 1100 does not include a history that the charging signal is received (NO in S106), when connector signal CNCT is stopped (YES in S110), power supply ECU 1100 transmits an IG_OFF command to HV_ECU 1200.

When HV_ECU 1200 receives the IG_OFF command (YES in S214), HV_ECU 1200 is deactivated (S216).

As described above, according to the control apparatus for the vehicle according to the present embodiment, HV_ECU having an operating frequency higher than that of the power supply ECU controls the electrical system of the hybrid vehicle to stop charging the battery pack when connector signal CNCT is stopped. Consequently, the charging can be stopped relatively immediately as compared to the case where the charging is stopped in response to the command from the power supply ECU.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A control apparatus for a vehicle provided with an electrical system having a battery storing electric power supplied from an external power supply through an EVSE, said control apparatus comprising:
   a first control unit that receives an input of a connector signal indicating that said EVSE is connected to the vehicle when said EVSE is connected to the vehicle; and
   a second control unit that has an operating frequency higher than an operating frequency of said first control unit and receives an input of said connector signal when said EVSE is connected to the vehicle, wherein
   said first control unit activates said second control unit when said connector signal is input, and
   said second control unit
   controls, in an activated state, said electrical system to charge said battery, and
   controls said electrical system to stop charging said battery when the input of said connector signal is stopped.

2. The control apparatus for a vehicle according to claim 1, wherein
   said second control unit
   transmits, during charging of said battery, a charging signal to said first control unit indicating that said battery is being charged, and
   stops transmitting said charging signal when charging of said battery is stopped, and
   said first control unit deactivates said second control unit when said charging signal is stopped.

3. The control apparatus for a vehicle according to claim 2, wherein
   said first control unit
   activates said second control unit by using an IG signal to output an IG_ON command, and
   deactivates said second control unit by using the IG signal to output an IG_OFF command.

4. The control apparatus for a vehicle according to claim 1, wherein
   said second control unit is an HV_ECU controlling charging of said battery, and
   said first control unit is a power supply ECU controlling activation and deactivation of said HV_ECU.

5. The control apparatus for a vehicle according to claim 1, wherein said first control unit and said second control unit are mounted in said vehicle.

6. The control apparatus for a vehicle according to claim 1, wherein said vehicle is a plug-in hybrid vehicle.

* * * * *